United States Patent [19]
Sonetaka

[11] Patent Number: 5,930,716
[45] Date of Patent: *Jul. 27, 1999

[54] RADIO CHANNEL ALLOCATING SYSTEM

[75] Inventor: Noriyoshi Sonetaka, Tokyo, Japan

[73] Assignee: NEC Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/603,264

[22] Filed: Feb. 20, 1996

[30] Foreign Application Priority Data

Feb. 21, 1995 [JP] Japan ................................. 7-032046

[51] Int. Cl.⁶ ................................................. H04B 7/212
[52] U.S. Cl. ........................... 455/450; 455/63; 455/395; 370/337
[58] Field of Search .................................. 455/33.3, 33.4, 455/33.1, 34.1, 34.2, 56.1, 62, 63, 295, 446, 447, 448, 449, 450; 370/321, 324, 337, 347, 350

[56] References Cited

U.S. PATENT DOCUMENTS

| | | | |
|---|---|---|---|
| 5,247,699 | 9/1993 | Hartman | 455/33.3 |
| 5,509,014 | 4/1996 | Utting | 455/33.3 |
| 5,551,060 | 8/1996 | Fujii et al. | 455/33.3 |

OTHER PUBLICATIONS

Fundamentals of Mobile Communication, Okumura et al., The Institute of Electronics, Information, and Communication Engineerts, Published by Korona–Shqa, 1986, Sections 8.2–8.2.3.

Reducing Interference on Same Channel in Mobvile Communication by Antenna Tilting, Fujii et al., 1990 Autumn National Convention of the Institute of electronics, Information, and Communication Engineers, B–247, 1990.

Intermodulation Interference in Radio Systems, Wallace C. Babcock, Aug. 25, 1952, pp. 63–73.

*Primary Examiner*—Reinhard J. Eisenzopf
*Assistant Examiner*—Lester G. Kincaid
*Attorney, Agent, or Firm*—Ostrolenk, Faber, Gerb & Soffen, LLP

[57] ABSTRACT

A base station 10 for an inner cell part and a base station 20 for an outer cell part are disposed at the center position of the outer cell part and the inner cell part, respectively. A service area is divided into a plurality of outer cell parts. Inside the outer cell parts, inner cell parts whose diameters are smaller than those of the outer cell parts and that have respective common centers are disposed. A channel controlling circuit 30 allocates optimum channels in such a manner that a third order intermodulation does in take place in the base stations 10 and 20. The base station for the inner cell part communicates radio waves with mobile stations in the inner cell part. The base station 20 for the outer cell part communicates radio waves with mobile stations in the outer cell part.

6 Claims, 8 Drawing Sheets

FIG. 8

| NUMBER OF CHANNELS FOR USE | CHANNEL NUMBER Ni FOR USE |
|---|---|
| 3 | 1, 2, 4 |
| 4 | 1, 2, 5, 7 |
| 5 | 1, 2, 5, 10, 12 |
| 6 | 1, 2, 5, 11, 13, 18 |
| 7 | 1, 2, 5, 11, 19, 24, 26 |
| 8 | 1, 2, 5, 10, 16, 23, 33, 35 |
| 9 | 1, 2, 6, 13, 26, 28, 36, 42, 45 |
| 10 | 1, 2, 7, 11, 24, 27, 35, 42, 54, 56 |
| 11 | 1, 4, 15, 17, 21, 42, 49, 54, 64, 72, 73 |
| 12 | 1, 3, 7, 25, 30, 41, 44, 56, 69, 76, 77, 86 |

TRIANGULAR ZONE

SQUARE ZONE

HEXAGONAL ZONE

RADIO CHANNEL ALLOCATING SYSTEM

BACKGROUND OF THE INVENTION

1. Field of the Invention

The present invention relates to a radio channel allocating system, in particular, to a radio channel allocating system for use with a digital communication system for allocating radio channels to a plurality of cells (radio zones) into which a service area is divided.

2. Description of the Related Art

In a conventional mobile communication system, a cellular system of which a service area is divided into a plurality of cells (radio zones) for effective use of frequencies has been used such as preventing interferences and disturbances.

Line designing methods of which frequencies are allocated to cells in such a manner that the same frequencies are reallocated to other cells that are spaced apart for a predetermined distance without interferences of the frequencies have been proposed and accomplished as, for example in (1) Victor Graziano, "Propagation Correlation at 900 MHz", IEEE Trans. on VT. Vol. VT-27, No. 4, 1978, (2) J. E. Stjernvall, "Calculation of Capacity and Co-channel Interference in A Cellular System", Nordic Seminar, pp. 209–217, Espoo, Finland, 1985, (3) J. J. Mikulski", Dyna TAC Cellular Portable Radio Telephone System Experience in the U.S. and the U.K.", IEEE Comm. magazine, Vol. 24, No. 2, 1986, and so forth.

As described in the above technical papers, cells (radio zones) are categorized as a triangular zone (shown in FIG. 9(a)), a square zone (shown in FIG. 9(b)), a hexagonal zone(shown in FIG. 9(c)), and so forth, corresponding to the shape of the cells. FIG. 10 shows the relation among the number of repetitive zones and the ratio of the distance of an interfering station at the worst interference point and the distance of a desired station (see Okumura et al, "Fundamentals of Mobile Communication (written in Japanese)", edited by The Institute of Electronics, Information, and Communication Engineers, published by Korona-sha, 1986). In FIGS. 9(a) to 9(c), numerals represent repetitive frequency patterns and repetitive zones.

As countermeasures for alleviating radio interferences to other cells, a system for mechanically or electrically tilting a main beam on the vertical plane of an antenna of a base station for reducing the interferences has been proposed (as in Fujii et al, "Reducing Interference on Same Channel in Mobile Communication by Antenna Tilting (written in Japanese)", 1990 Autumn National Convention of The Institute of Electronics, Information, and Communication Engineers, b-247, 1990).

When a plurality of signals are input to a non-linear circuit such as a transmitting unit or a receiving unit, a signal with a third frequency other than frequencies of the input signals (namely, a intermodulation wave) are produced by the plurality of signals. For example, when the frequency of the intermodulation wave that products in a receiving unit of a base station or the like due to a signal with a high input level accords with the frequency of a signal with a low input level generated by a child station or a mobile station, an intermodulation interference takes place.

In the conventional cell reuse system and the tilt antenna system, they describe that only interferences that take place in other cells are prevented. In other words, an interference due to a intermodulation wave that takes place in the same cell cannot be prevented.

A radio channel allocating system that considers the influence of a intermodulation wave that takes place due to a radio channel allocation has been proposed by W. C. Babcock, "Intermodulation Interference in Radio Systems," Bell System Technical Journal, 32, 1, pp. 66–73, 1953. However, in the conventional radio channel allocating system, an interference to a normal signal in the case that the frequency of a intermodulation wave accords with the frequency of a signal received by a base station in a particular zone is considered. In this system, frequencies for individual zones are selected so that a particular condition is satisfied. However, an influence of which a mobile station incorrectly receives a intermodulation wave with a frequency that is not used in the zone as a wave transmitted by a base station is not considered.

Moreover, the conventional radio channel allocating system does not have countermeasures of which cells are multiplexed corresponding to the distance from a base station and channels are repeatedly allocated to inner cell parts and outer cell parts.

Furthermore, in the system of which channels with the same frequencies are multiplexed by time division multiplex accessing method for increasing the accommodating ratio of subscribers, interferences against guard slots are not considered. Thus, a main signal wave is adversely interfered with a intermodulation

SUMMARY OF THE INVENTION

The present invention is made from the above-described point of view. An object of the present invention is to provide a radio channel allocating system for multiplexing cells corresponding to the distance from a base station so as to effectively use frequencies and prevent interferences due to intermodulation waves between base stations in an inner cell part and an outer cell part.

To accomplish the above-described object, the present invention is a radio channel allocating system having a service area divided into a plurality of cells and for communicating radio waves among base stations disposed at center positions of the cells and mobile stations or stationary stations, the service area being divided into a plurality of outer cell parts, inside the outer cell parts, inner cell parts being disposed at common positions that are almost center positions of the outer cell parts, the diameters of the inner cell parts being smaller than the diameters of the outer cell parts, the system comprising a channel controlling circuit disposed at the center position of each of the outer cell part and the inner cell part of each of the cells and adapted for allocating radio channels of the base station for the outer cell part that communicates radio waves with mobile stations or stationary stations present in the outer cell part and the base station for the inner cell part that communicates radio waves with mobile stations or stationary stations present in the inner cell part so that the following expressions are satisfied:

$2N_i - N_j \neq N_n$ (where $i, j, n = 1$ to $m$; $i \neq j$)

$N_i + N_j - N_k \neq N_n$ (where $i, j, k, n = 1$ to $m$; $i \neq j$; $i \neq k$; $j \neq k$)

where $N_i$ is a channel number that is an i-th frequency with a predetermined interval against another adjacent channel; and m is the number of channels for use.

These and other objects, features and advantages of the present invention will become more apparent in light of the following detailed description of best mode embodiments thereof, as illustrated in the accompanying drawings.

BRIEF DESCRIPTION OF DRAWINGS

FIG. 8 is a schematic diagram for explaining an optimum channel allocation free from a third order intermodulation;

DESCRIPTION OF THE PREFERRED EMBODIMENTS

Before explaining the preferred embodiments of the present invention, the theory of operation of the present invention will be described.

In a digital stationary communication system and a digital mobile communication system, a cellular system of which a service area is divided into a plurality cells for effectively using frequencies without occurrences of interference can be effectively used. In a low traffic region such as a rural region, the traffic concentrates to the center of a cell. As the distance to a base station increases, the traffic decreases. In this case, corresponding to the traffic, a cell can be separated into a cell that is close to the base station and a cell that is apart from the base station.

According to the present invention, a cell is divided into an inner cell part and an outer cell part that have a common center. However, in a system of which independent base stations are disposed in a plurality of cells, depending on a channel allocation, an intermodulation wave takes place. To prevent such a problem, according to the present invention, the radio channels of the base station for the outer cell part and the base station for the inner cell part are allocated so that the following expressions are satisfied:

$2N_i - N_j \neq N_n$ (where i, j, n=1 to m; i≠j)

$N_i + N_j - N_k \neq N_n$ (where i, j, k, n=1 to m; i≠j; i≠k; j≠k)

where $N_i$ is a channel number that is an i-th frequency with a predetermined interval against another adjacent channel; and m is the number of channels for use. Thus, the influence of the mutual modulation is prevented.

In addition, according to the present invention, the radio channels of the base stations for the adjacent outer cell parts or the radio channels of the base stations for the outer cell part and the inner cell part in each of p zones as a repetitive cell pattern are allocated to the channel numbers $N_i$, $N_j$, and $N_n$ or $N_i$, $N_j$, $N_k$, and $N_n$. Thus, the influence of the mutual modulation is prevented.

Figure 1:
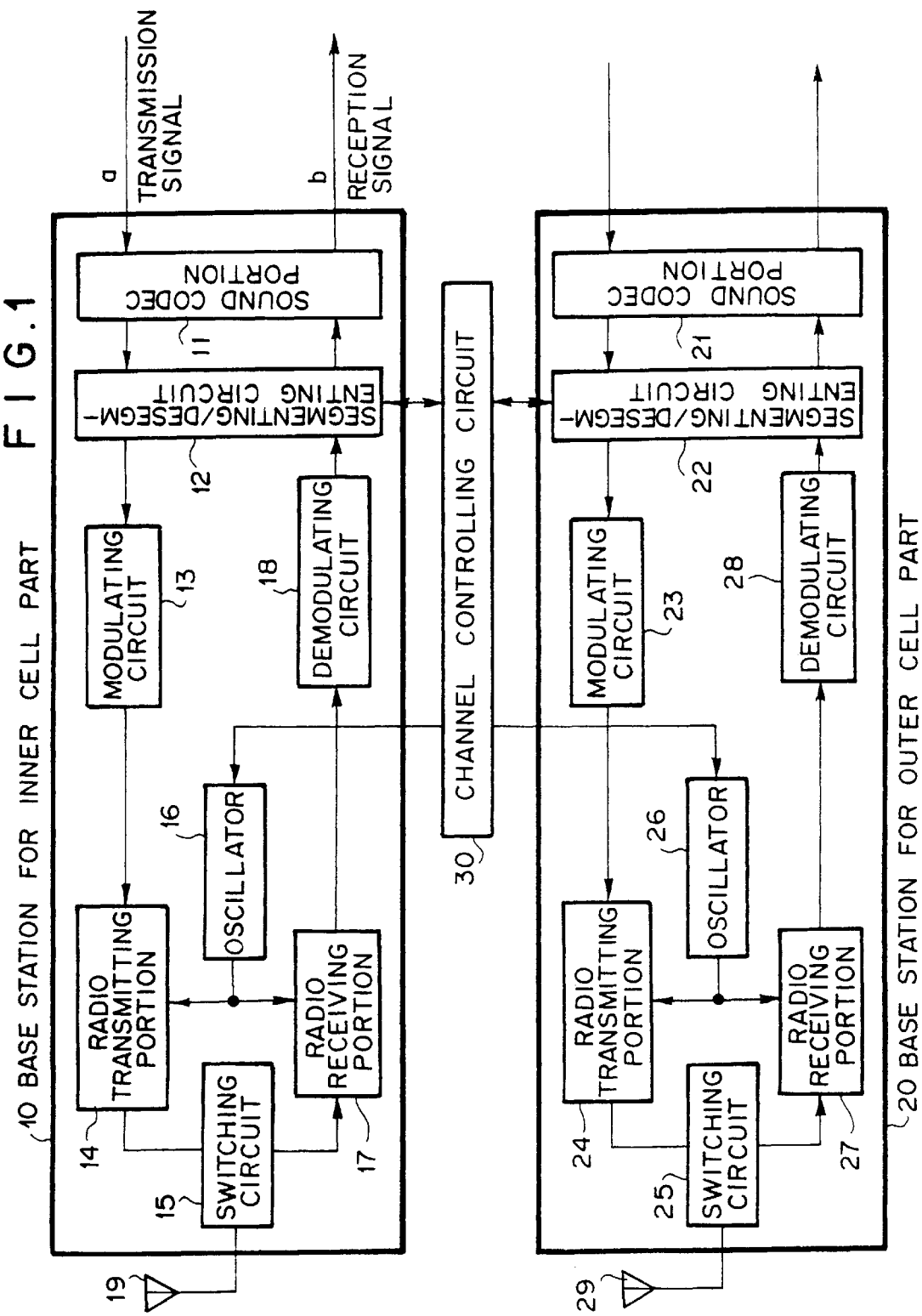
FIG. 1 is a block diagram showing the structure of an embodiment of the present invention.
Figure 2:
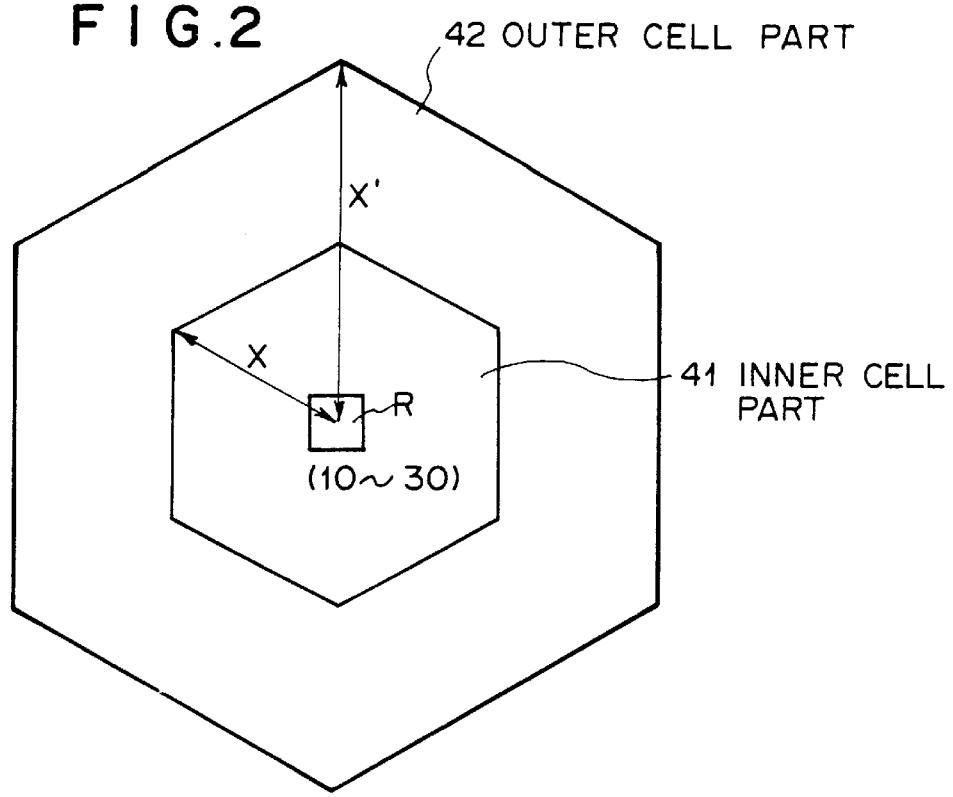
FIG. 2 is a schematic diagram showing the structure of a cell according to the embodiment of the present invention.

Next, an embodiment of the present invention will be described. FIG. 1 is a block diagram showing the structure of an embodiment of the present invention. FIG. 2 is a schematic diagram showing the structure of a cell according to the present invention. Referring to FIG. 2, the cell is composed of an inner cell part 41 (with a diameter x) and an outer cell part 42 (with a diameter x') that have a common center. In addition, at the common center of the inner cell part 41 and the outer cell part 42, a base station portion R is disposed. The outer cell part 42 contacts adjacent outer cell parts of other cells. In such a manner, the service area is filled with the cells. Thus, the inner cell part 41 is spaced apart from inner cell parts of adjacent cells. A radio wave transmitted from a base station in the inner cell part 41 does not reach inner cell parts of the adjacent cells. Thus, the same frequencies can be used in the inner cell parts.

As shown in FIG. 1, the base station portion R is composed of a base station 10 for an inner cell part, a base station 20 for an outer cell part, a channel controlling circuit 30. The channel controlling portion 30 generates transmission/ reception timings of the base stations 10 and 20, generates segmenting/desegmenting timings of TDMA frames, and selects a channel corresponding to a intermodulation wave.

In FIG. 1, the structure of the base station 10 for the inner cell part is the same as the structure of the base station 20 for the outer cell part. The base stations 10 and 20 are composed of sound codec portions 11 and 21, segmenting/ desegmenting circuits 12 and 22, modulating circuits 13 and 23, radio transmitting portions 14 and 24, switching circuits 15 and 25, oscillators 16 and 26, radio receiving portions 17 and 27, demodulating portions 18 and 28, and antennas 19 and 29, respectively. However, as described above, since the diameter of the inner cell part 41 is smaller than the diameter of the outer cell part 42, the transmitting power of the radio transmitting portion 14 of the base station 10 for the inner cell part is smaller than the transmitting power of the radio transmitting portion 24 of the base station 20 for the outer cell part. In addition, the receiving sensitivity of the radio receiving portion 17 is lower than the receiving sensitivity of the radio receiving portion 27.

Next, the operation of the embodiment will be described. A transmission signal a is sent to the sound codec portion 11. The sound codec portion 11 encodes a sound signal of the transmission signal a. The resultant signal is sent to the segmenting/desegmenting circuit 12. The segmenting/ desegmenting circuit 12 segments the encoded signal into TDMA radio frames. The resultant signal is supplied to the modulating circuit 13. The modulating circuit 13 modulates the frame signal corresponding to a predetermined modulating method. The resultant signal is sent to the radio transmitting portion 14. The radio transmitting portion 14 converts the modulated wave into a signal in a transmission frequency band corresponding to a local oscillation signal received from the oscillator 16. The resultant signal is transmitted through the switching circuit 15 and the antenna 19.

On the other hand, a signal is received from the antenna 19 and sent to the switching circuit 15. The radio receiving portion 17 selects a signal with a predetermined frequency on a radio channel allocated to the station corresponding to a local oscillation signal received from the oscillator 19. The selected signal is sent to the demodulating circuit 18. The demodulating circuit 18 demodulates the selected signal and outputs a demodulated signal on a base band. The demodulated signal is sent to the segmenting/desegmenting circuit 12. The segmenting/desegmenting circuit 12 extracts desired reception data from the TDMA radio frames. The extracted data is sent to the sound codec portion 11. The sound codec portion 11 decodes the encoded data and outputs reception data b.

The above-described operation of the base station 10 for the inner cell part applies to the base station 20 for the outer cell part. The channel controlling circuit 30 has functions for receiving a control signal with information from the segmenting/desegmenting circuit 12 and for selecting channels so that the radio frequency (channel) used for the base station 10 for the inner cell part does not interfere with the radio frequency used for the base station 20 for the outer cell part. In reality, the channel controlling portion 30 controls the local oscillation frequencies of the oscillators 16 and 26 to predetermined frequencies.

The level of a intermodulation wave that takes place in the case that a plurality of signals with different frequencies are input to a non-linear circuit is inversely proportional to the order number thereof. Thus, the influence of the third order intermodulation wave is the largest. The influence of the quartic intermodulation wave or higher order intermodulation waves can be substantially ignored. Consequently, countermeasures against the ternary intermodulation wave are required. As a ternary intermodulation wave, when signals with frequencies f1 and f2 are input, countermeasures against a frequency (2f1−f2) are required. When signals with frequencies f1, f2, and f3 are input, countermeasures against a frequency (f1+f2−f3) are required.

When the low limit frequency of the system is denoted by $f_L$ and the channel interval is denoted by $\Delta f$, an N-th frequency is represented by $(N \times \Delta f + (f_L - \Delta f))$. When an i-th frequency is referred to as a channel number Ni, an j-th frequency is referred to as a channel number Nj, an k-th frequency is referred to as a channel number Nk, due to the countermeasures against the above-mentioned frequencies, it is known that the channel allocation free from the third order intermodulation is given by the following expressions (see Okuyama et al, "Fundamentals of Mobile Communication (written in Japanese)," edited by The Institute of Electronics, Information, and Communication Engineers, published by Korona-sha, p. 204).

$$2Ni - Nj \neq Nn \text{ (where i, j, n=1 to m; i} \neq \text{j)} \quad (1)$$

$$Ni + Nj - Nk \neq Nn \text{ (where i, j, k, n=1 to m; i} \neq \text{j; j} \neq \text{k)} \quad (2)$$

In this embodiment, the channel controlling portion 30 allocates channels for the inner cell part 41 (An) and the outer cell part 42 (Bn) so that the above-described expressions (1) and (2) are satisfied. For example, when the number of channels m is "3" to "12", because of the expressions (1) and (2), the channel number Ni of the optimum channel allocation free from the third order intermodulation is given as shown in FIG. 8. Referring to FIG. 8, when the number of channels m for use is "3", Ni is N1, N2, and N4 (this applies to Nj and Nn; Nj is N1, N2, and N4, and Nn is N1, N2, and N4).

Figure 3:
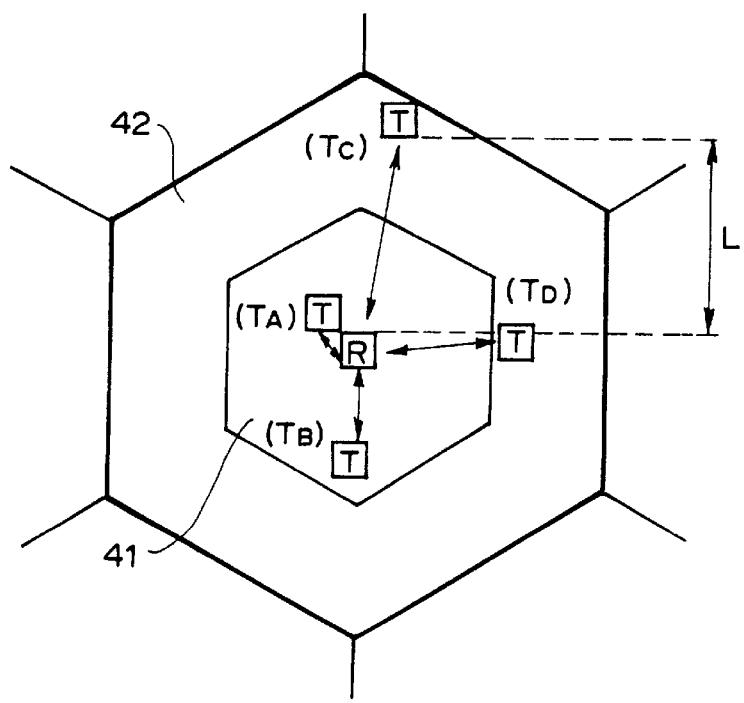
FIG. 3 is a schematic diagram for explaining a radio channel allocation control considering an interference between each TDMA slot.
Figure 4:
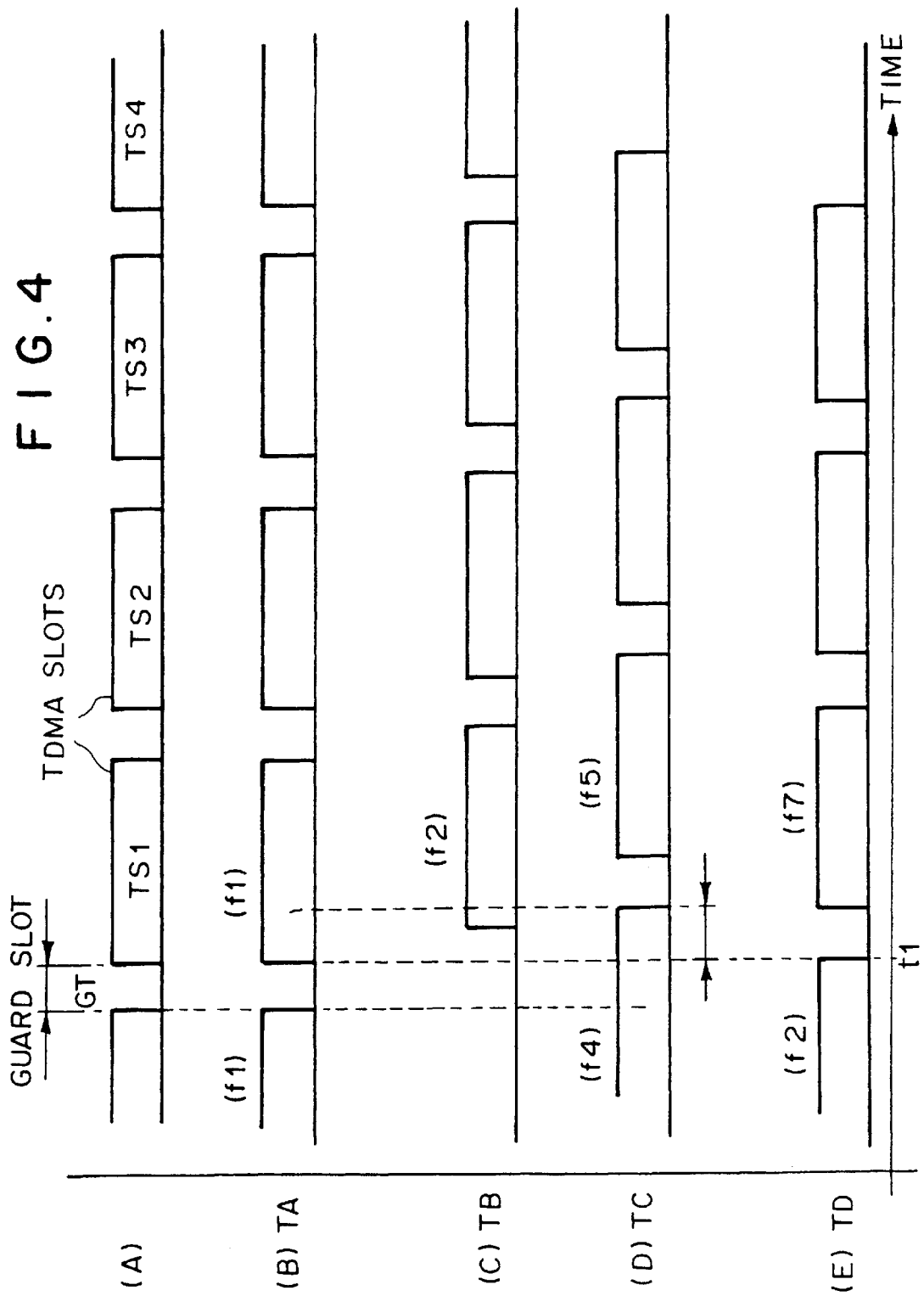
FIGS. 4(A) to (E) are time charts for explaining the operation shown in FIG. 3.

In this embodiment, the channel controlling circuit 30 communicates information with base stations including mobile stations (child stations) that the base stations 10 and 20 accommodate and child stations adjacent thereto and obtains frequencies for use, a diameter of cells, timings of signals received from the child stations so as to perform an optimal frequency allocation. Corresponding to the obtained frequency allocation, the channel controlling circuit 30 performs the radio channel allocation while sensing carriers and measuring synchronous timings in consideration of interferences among TDMA slots. With reference to FIGS. 3 and 4, the operation of the channel controlling circuit 30 will be described. In FIG. 3, similar portions to those in FIG. 2 are denoted by similar reference numerals and their description is omitted. In FIG. 3, mobile stations TA and TB are present in an inner cell part 41. In addition, mobile stations TC and TD are present in an outer cell part 42. A base station portion R receive signals from the mobile stations TA, TC, and TD. When the base station portion R receives signals as shown in FIGS. 4(B), 4(D), and 4(E), it uses a frequency f1 (channel number N1) with the mobile station TA, a frequency f4 (channel number N4) with the mobile station TC, and a frequency f2 (channel number N2) with the mobile station TD as optimum channel numbers in the case that the number of channels m is "3" as shown in FIG. 8.

In this condition, consider the situation that the mobile station TC is apart from the base station portion R for a distance L that is a radius x' shown in FIG. 3. Thus, a signal received from the mobile station TC exceeds an allowable value of a guard slot GT of a reference TDMA slot shown in FIG. 4(A). After time t1, as shown in FIGS. 4(B) and 4(C), if the signal received from the mobile station TC exceeds guard slots of signals received from the mobile stations TA and TB, the channel controlling circuit 30 considers TDMA frame timings with the base station 10 for the inner cell part and the base station 20 for the outer cell part and switches these frequencies to a frequency f5 (channel number N5) with the mobile station TC, a frequency f7 (channel number N7) with the mobile station TD, and a frequency f2 (channel number N2) with the mobile station TB. Thus, the base station portion R can communicate the mobile stations TA to TD with the optimum channel numbers in the case that the number of channels m is "4" shown in FIG. 8.

Consequently, according to the above-described embodiment, since the service area is divided by the outer cell part 42 and the inner cell part 41 is disposed inside the outer cell part 42 with the common center, in the inner cell part 41, the same frequencies as those used in other inner cell parts can be used. Thus, the frequencies can be effectively used. In addition, since optimum channels are allocated between the inner cell part 41 and the outer cell part 42 and between each adjacent outer cell part, interferences of signals can be prevented.

Figure 5:
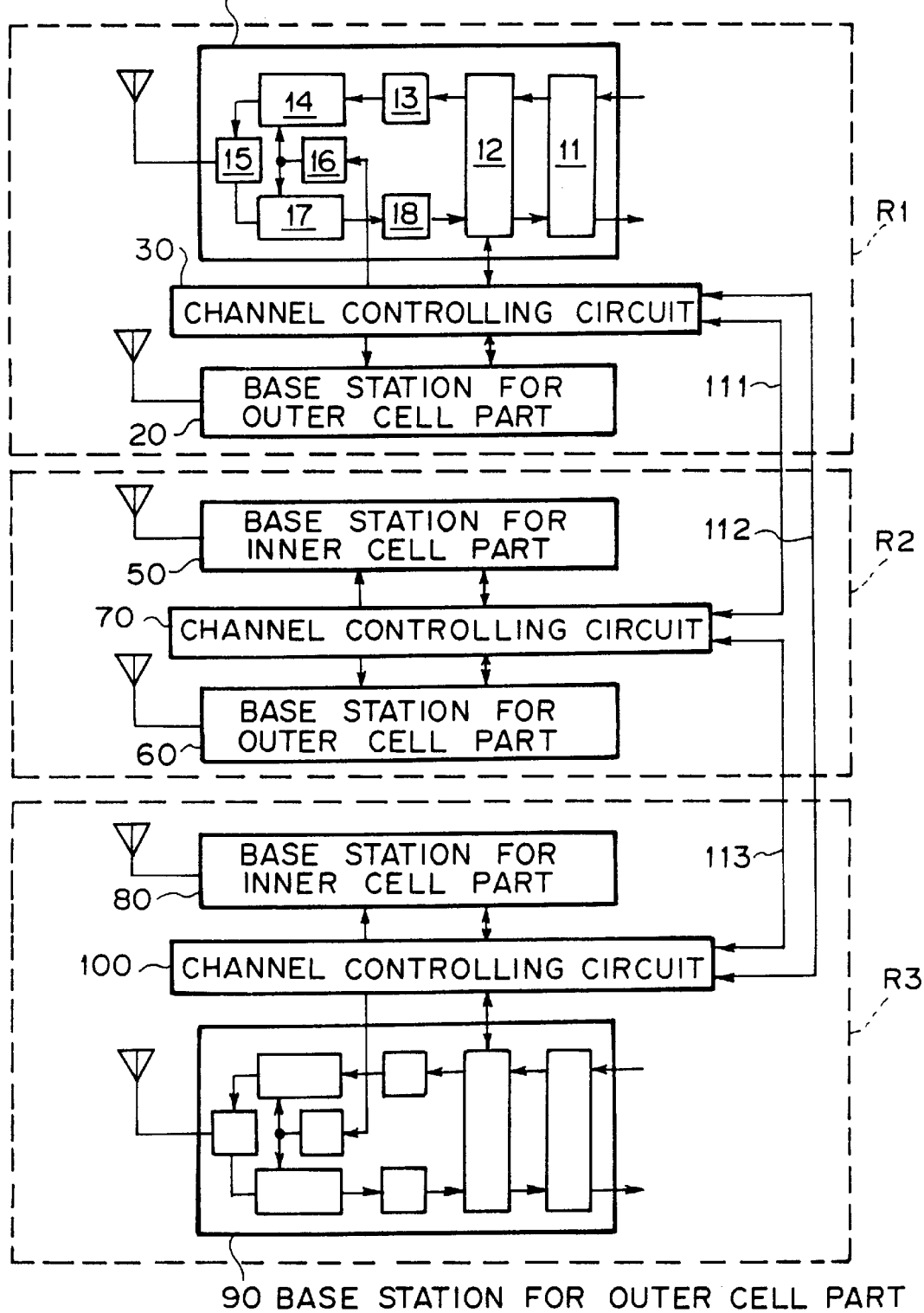
FIG. 5 is a block diagram showing the structure of another embodiment of the present invention.
Figure 6:
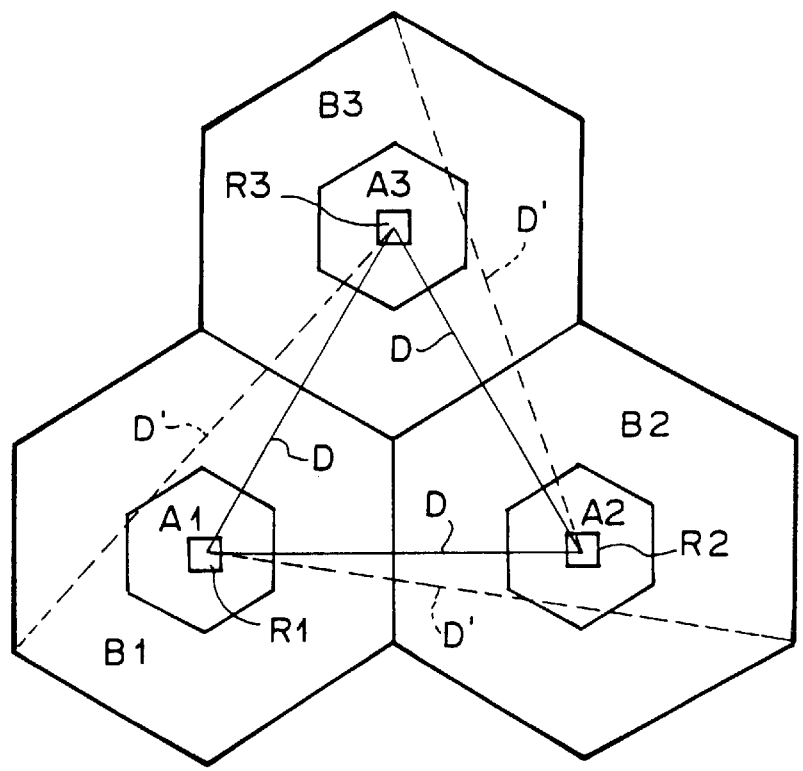
FIG. 6 is a schematic diagram showing the structure of cells according to the embodiment shown in FIG. 5.

Next, another embodiment of the present invention will be described. FIG. 5 is a block diagram showing the structure of another embodiment of the present invention. The embodiment shown in FIG. 5 is applied to a three-zone repetitive pattern shown in FIG. 6. In FIG. 6, outer cell parts B1, B2, and B3 are adjacently disposed as hexagonal zones. Inside the outer cell parts B1, B2, and B3, inner cell parts A1, A2, and A3 are disposed, respectively.

A base station portion R1 is disposed at the center position of the inner cell part Al and the outer cell part B1. A base station portion R2 is disposed at the center position of the inner cell part A2 and the outer cell part B2. A base station portion R3 is disposed at the center position of the inner cell part A3 and the outer cell part B3. The distance between each base station portion is denoted by D. The maximum distance between each base station portion and a stationary station or a mobile station (child station) is denoted by D'.

The structures of the base station portions R1, R2, and R3 are the same. In other words, as shown in FIG. 5, the base station portion R1 is composed of a base station 10 for an inner cell part, a base station 20 for an outer cell part, and a channel controlling circuit 30. The base station portion R2 is composed of a base station 50 for an inner cell part, a base station 60 for an outer cell part, and a channel controlling circuit 70. The base station portion R3 is composed of a base station 80 for an inner cell part, a base station 90 for an inner cell part, and a channel controlling circuit 100. The channel controlling circuits 30 and 70 are connected with a cable 111. The channel controlling circuits 70 and 100 are connected with a cable 113. The channel controlling circuits 30 and 100 are connected with a cable 112. It should be noted that the cables 111 to 113 may be radio means.

In the embodiment shown in FIG. 5, the radio channels are allocated between the inner cell part A1 and the outer cell part B1, between the inner cell part A2 and the outer cell part B2, and between the inner cell part A3 and the outer cell part B3 in such a manner that the above-described expressions (1) and (2) are satisfied. In addition, the above-described radio channels are allocated between the outer cell parts B1 and B2, between the outer cell parts B1 and B3, and between the outer cell parts B2 and B3.

In the embodiment shown in FIG. 5, cells with the same frequencies are satisfactorily spaced apart and the outer cell parts B1 to B3 are disposed as a three-zone repetitive pattern. Thus, the frequencies can be more effectively used than those of the embodiment shown in FIG. 1. In addition, in the embodiment shown in FIG. 5, base stations in the repetitive zones exchange information such as timings of TDMA slots, the distance (time) of the cell radius, and active/alternative radio channels. Thus, the radio channels can be optimally allocated.

Figure 7:
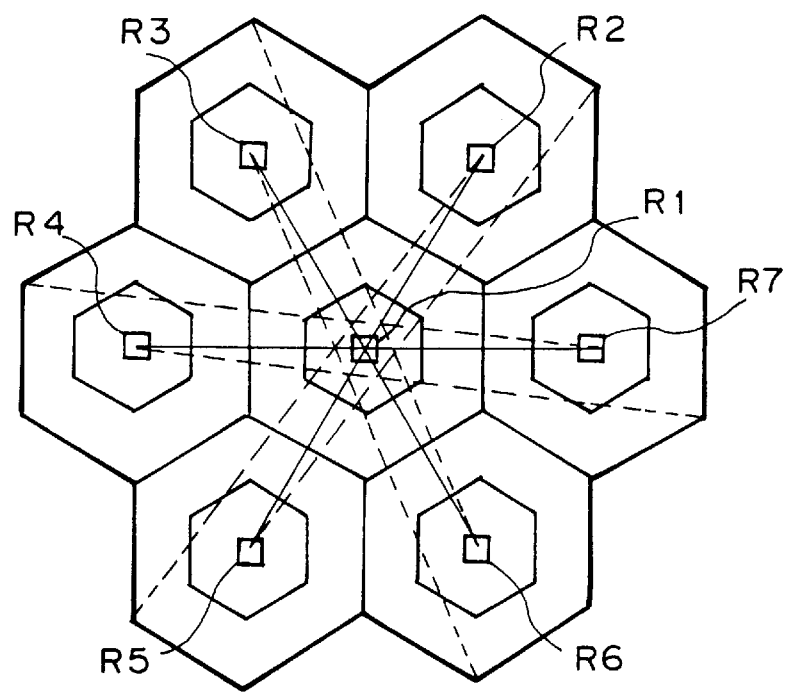
FIG. 7 is a schematic diagram showing the structure of cells according to the embodiment shown in FIG. 5.
Figure 9A:
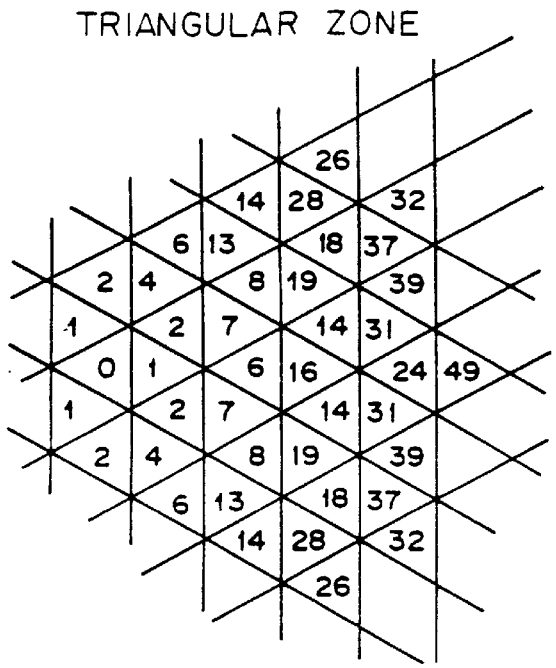
FIGS. 9(a) to 9(c) are schematic diagrams showing conventional repetitive patterns and repetitive zone numbers.
Figure 9B:
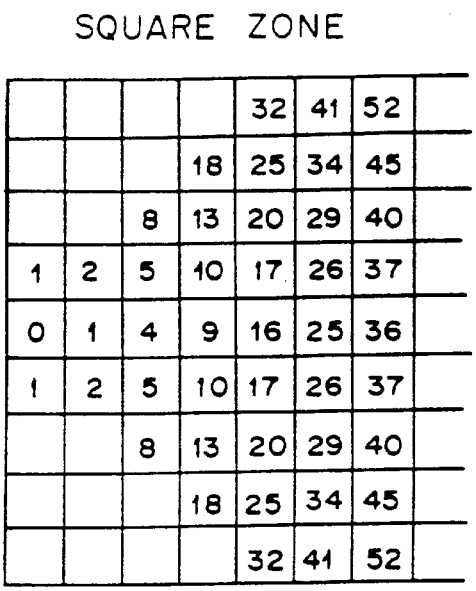
Figure 9C:
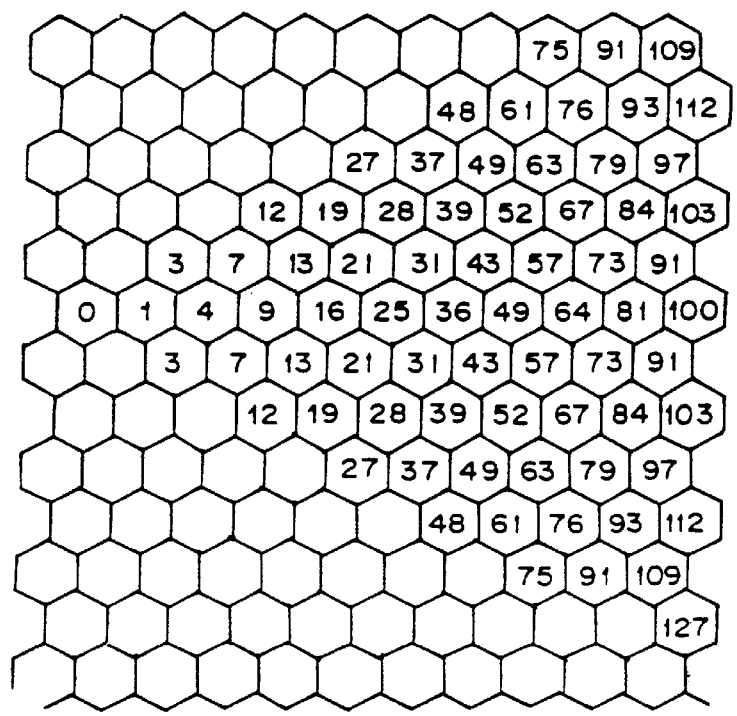
Figure 10:
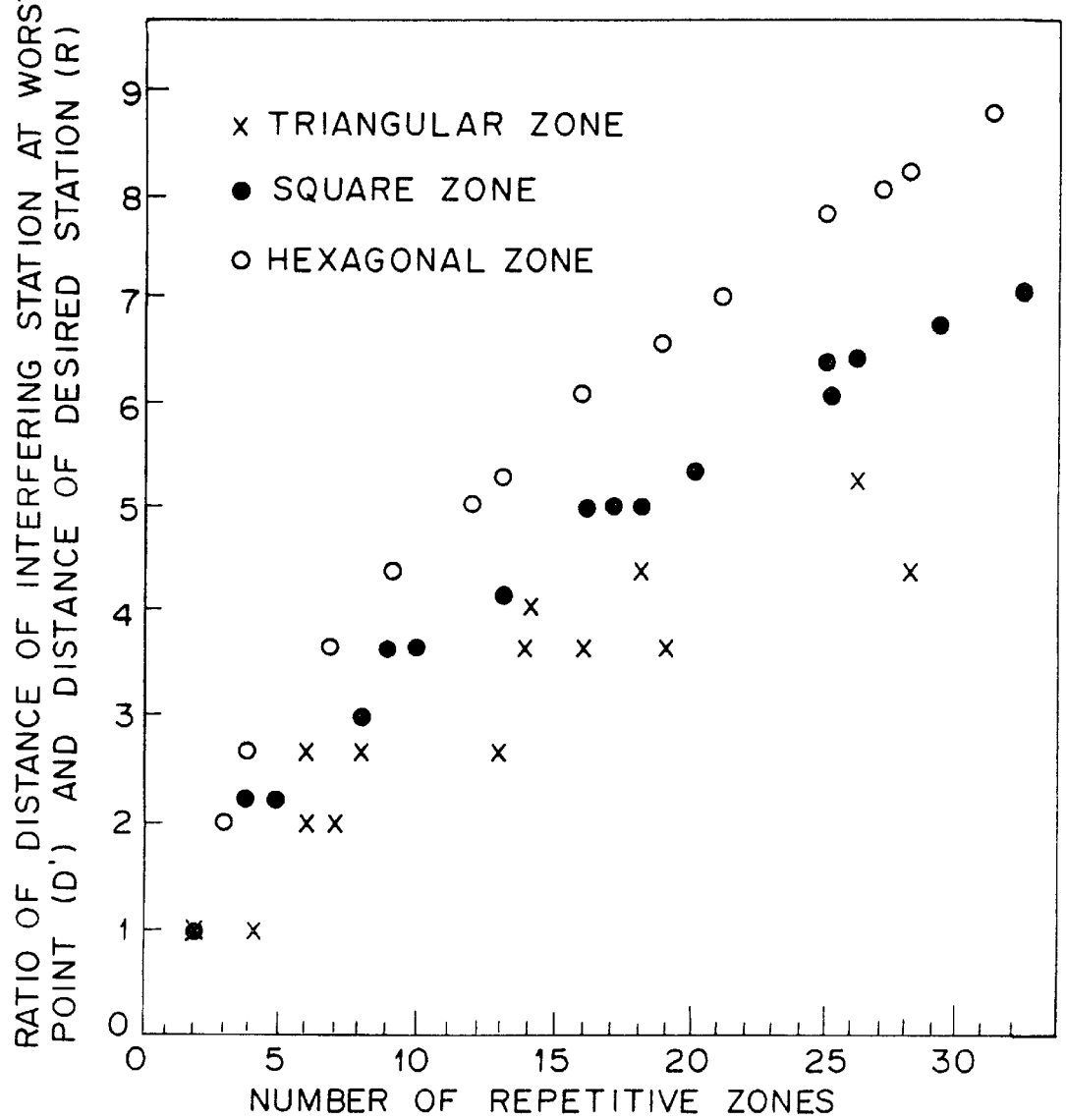
FIG. 10 is a schematic diagram showing an example of the number of repetitive zones and the interference distance at the worst interference point.

The present invention can be also applied to a seven-zone repetitive pattern as shown in FIG. 7. In addition, the present invention can be applied to other multiple-zone repetitive patterns. In FIG. 7, as with the structure shown in FIG. 5, base station portions R1 to R7 are disposed at common center positions of outer cell parts and inner cell parts of seven hexagonal zones. In the base station portions R1 to R7, base stations for inner cell parts and base stations for outer cell parts are disposed. These base stations exchange information between each base station. Moreover, it should be noted that the present invention can be applied to a structure of which radio communications are performed among base stations and stationary stations.

As described above, according to the present invention, the radio channels of the base station for the outer cell part and the base station for the inner cell part, or the radio channels of the base stations for the adjacent outer cell parts, or the radio channels of the base station for the outer cell part and the base station for the inner cell part of each of zones of a repetitive zone pattern are allocated so that the following expressions are satisfied:

$2N_i - N_j \neq N_n$ (where i, j, n=1 to m; i≠j)

$N_i + N_j - N_k \neq N_n$ (where i, j, k, n=1 to m; i≠j; i≠k; j≠k)

where $N_i$ is a channel number that is an i-th frequency with a predetermined interval against another adjacent channel; and m is the number of channels for use. Thus, the influence of the intermodulation in the outer cell part and the inner cell part can be prevented. Consequently, the influence of radio channels used between each inner cell part can be removed. Thus, the same frequencies (channel numbers) can be used as frequencies between each inner cell part. Consequently, the frequencies can be effectively used. In addition, high line quality free of an interference of a intermodulation against a main signal wave can be accomplished.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A radio channel allocating system, having a service area divided into a plurality of cells, for communicating radio waves among base stations disposed at center positions of each cell and a plurality of mobile stations, wherein the service area is divided into a plurality of outer cell parts and inner cell parts, the inner cell parts being disposed at common positions that are almost center positions of the outer cell parts, the diameters of the inner cell parts being smaller than the diameters of the outer cell parts, the system comprising:

a channel controlling circuit disposed at the center position of each of the outer cell part and the inner cell part of each of the cells and adapted for selecting radio channels of the base station for the outer cell part that communicates waves with mobile stations present in the outer cell part and the base station for the inner cell part that communicates radio waves with mobile stations present in the inner cell part so that the following expressions are satisfied:

$2N_i - N_j \neq N_j$ (where i, j, n=1 to m; i≠j)

$N_i + N_j - N_k \neq N_n$ (where i, j, k, n=1 to m; i≠j, k, j≠k)

where $N_i$, $N_j$, $N_n$ and $N_k$ are channel numbers that are an i-th frequency, a j-th frequency, an n-frequency and a K-frequency, respectively, with a predetermined interval against another adjacent channel; and m is the number of channels for use, and wherein when a guard slot of a reference Time Division Multiple Access (TDMA) slot overlaps one of the selected channels by more than an allowable value, the selected channels are changed to the satisfied channel allocation between the base station in the outer cell part and the base station in the inner cell part.

2. The radio channel allocating system as set forth in claim 1, wherein said channel controlling circuit is adapted for selecting channels in consideration of timings of slots that accord with a selecting condition of the channel number $N_n$ in the case that the difference in distance between the radius of the inner cell part and the radius of the outer cell part exceeds a guard slot defined between each slot corresponding to time division multiplex accessing system, to prevent interference.

3. The radio channel allocating system as set forth in claim 1, wherein said channel controlling circuit is adapted for selecting radio channels of the base stations adjacently disposed so that the following expressions are satisfied:

$2N_i - N_j \neq N_n$ (where i, j, n=1 to m; i≠j)

$N_i + N_j - N_k \neq N_n$ (where i, j, k, n=1 to m; i≠j, k; j≠k)

where $N_i$, $N_j$, $N_n$ and $N_k$ are channel numbers that an i-th frequency, a j-th frequency, an n-frequency and a k-frequency, respectively at a predetermined interval against an adjacent channel.

4. The radio channel allocating system as set forth in claim 3, wherein said channel controlling circuit is adapted for selecting channels in consideration of timings of slots that accord with a selecting condition of the channel number $N_n$ in the case that the difference in distance between the radius of the inner cell part and the radius of the outer cell part exceeds a guard slot defined between each slot corresponding to time division multiplex accessing system, to prevent interference.

5. A radio channel allocating system having a repetitive cell pattern composed of p zones, each of the p zones having an outer cell part and an inner cell part, the system comprising:

a channel controlling circuit disposed at the center position of each of the outer cell part and the inner cell part in the same zone and adapted for selecting radio channels of the base station for the outer cell part that communicates radio waves with mobile stations present in the outer cell part and the base station for the inner cell part that communicates radio waves with mobile stations present in the outer cell part and the base station for the inner cell part that communicates radio waves with mobile stations present in the inner cell part so that the following expressions are satisfied:

$2Ni-Nj \neq Nn$ (where i, j, n=1 to m; i≠j)

$Ni+Nj-Nk \neq Nn$ (where i, j, k, n=1 to m; i≠j, k; j≠k)

Ni, Nj, Nn and Nk are channel numbers that are an i-th frequency, a j-th frequency, an n-frequency and a k-frequency, respectively, with a predetermined interval against another adjacent channel; and m is the number of channels for use, and wherein when a guard slot of a reference Time Division Multiple Access (TDMA) slot overlaps one of the selected channels by more than an allowable value, the selected channels are changed to the satisfied channel allocation between the base station in the outer cell part and the base station in the inner cell part.

6. The radio channel allocating system as set forth in claim 5, wherein said channel controlling circuit is adapted for selecting channels in consideration of timings of slots that accord with a selecting condition of the channel number Nn in the case that the difference in distance between the radius of the inner cell part and the radius of the outer cell part exceeds a guard slot defined between each slot corresponding to time division multiplex accessing system, to prevent interference.

* * * * *